(12) United States Patent
Fritel et al.

(10) Patent No.: US 9,938,117 B2
(45) Date of Patent: Apr. 10, 2018

(54) MOBILE CONDUCTOR LIFT

(71) Applicant: Fritel & Associates, LLC, Waco, TX (US)

(72) Inventors: Raymond Fritel, Waco, TX (US);
Melanie K. Martin, Waco, TX (US);
Karsten Lee Farley, Elm Mott, TX (US)

(73) Assignee: Fritel & Associates, LLC, Waco, TX (US)

( * ) Notice: Subject to any disclaimer, the term of this patent is extended or adjusted under 35 U.S.C. 154(b) by 129 days.

(21) Appl. No.: 14/338,936

(22) Filed: Jul. 23, 2014

(65) Prior Publication Data

US 2015/0030426 A1 Jan. 29, 2015

Related U.S. Application Data

(60) Provisional application No. 61/857,771, filed on Jul. 24, 2013, provisional application No. 61/883,993, filed on Sep. 28, 2013.

(51) Int. Cl.
| | |
|---|---|
| *H02G 1/02* | (2006.01) |
| *B66C 1/22* | (2006.01) |
| *B66C 1/10* | (2006.01) |
| *B66C 1/68* | (2006.01) |
| *B66C 23/88* | (2006.01) |

(52) U.S. Cl.
CPC .................. *B66C 1/22* (2013.01); *B66C 1/10* (2013.01); *B66C 1/68* (2013.01); *B66C 23/88* (2013.01); *H02G 1/02* (2013.01)

(58) Field of Classification Search
CPC .. H02G 1/04; H02G 7/12; H02G 1/02; H02G 1/00; H02G 7/00; H02G 7/05; B66C 1/22; B66C 1/10; B66C 1/68; B66C 23/88

USPC .................. 254/134.3 PA, 134.4 PA; 269/53; 414/729
See application file for complete search history.

(56) References Cited

U.S. PATENT DOCUMENTS

| | | | | |
|---|---|---|---|---|
| 1,050,004 | A | * | 1/1913 | Cronin ..................... H02G 1/02 248/49 |
| 1,501,590 | A | * | 7/1924 | Floyd ....................... H02G 1/02 248/49 |
| 1,793,733 | A | * | 2/1931 | Bodendieck ............. H02G 7/20 174/45 R |
| 3,145,016 | A | * | 8/1964 | Leithiser, Jr. ............ H02G 1/04 254/134.3 R |
| 4,466,506 | A | * | 8/1984 | Dolenti .................... H02G 1/02 182/2.1 |
| 4,721,213 | A | * | 1/1988 | Eitel ...................... B66F 11/044 182/2.11 |

(Continued)

FOREIGN PATENT DOCUMENTS

FR 422697 A * 3/1911 ............... B66C 1/22

*Primary Examiner* — Joseph J Hail
*Assistant Examiner* — Jon Taylor
(74) *Attorney, Agent, or Firm* — George M. Tompkins; Tompkins, P.C.

(57) ABSTRACT

A conductor lift attachment for a mobile boom or crane vehicle allowing temporarily support of power transmission conductors, e.g., for installation, repair, or maintenance operations. The conductor lift is hingedly attached to a boom tip so that the conductor lift is readily movable between deployed and stowed positions. The conductor lift comprises hinged arms that are selectively movable between opposed, parallel, and intermediate positions.

17 Claims, 13 Drawing Sheets

(56) References Cited

U.S. PATENT DOCUMENTS

| | | | |
|---|---|---|---|
| 4,838,381 A | 6/1989 | Michaud et al. | |
| 4,973,795 A | 11/1990 | Sharpe | |
| 5,076,449 A * | 12/1991 | Clutter | B66F 11/044 182/2.1 |
| 5,538,207 A * | 7/1996 | O'Connell | H02G 1/04 182/2.11 |
| 6,198,062 B1 * | 3/2001 | Mather | H01H 33/022 218/120 |
| 6,325,749 B1 * | 12/2001 | Inokuchi | B25J 5/06 182/2.11 |
| 6,837,671 B2 * | 1/2005 | Devine | H02G 1/04 212/168 |
| 8,226,069 B2 * | 7/2012 | Devine | H02G 1/04 182/2.1 |
| 8,443,936 B1 | 5/2013 | Raymond | |
| 8,585,020 B2 * | 11/2013 | Devine | H02G 1/04 254/134.3 PA |
| 8,684,333 B2 * | 4/2014 | Devine | H02G 1/02 182/2.1 |
| 8,714,525 B2 * | 5/2014 | Lessard | H02G 1/04 254/134.3 PA |
| 9,038,989 B2 * | 5/2015 | Devine | H02G 1/04 182/2.1 |
| 9,197,041 B2 * | 11/2015 | Wabnegger | H02G 1/04 |
| 9,203,219 B2 * | 12/2015 | Devine | H02G 1/02 |
| 2008/0246010 A1 * | 10/2008 | Barthold | H02G 1/04 254/134.3 R |
| 2009/0095522 A1 | 4/2009 | Barthold | |
| 2009/0206305 A1 | 8/2009 | Devine et al. | |
| 2010/0133490 A1 * | 6/2010 | Devine | H02G 1/04 254/134.3 PA |
| 2010/0155101 A1 | 6/2010 | Moore et al. | |
| 2012/0175575 A1 * | 7/2012 | Devine | H02G 1/02 254/134.3 PA |
| 2012/0286108 A1 | 11/2012 | Devine et al. | |

\* cited by examiner

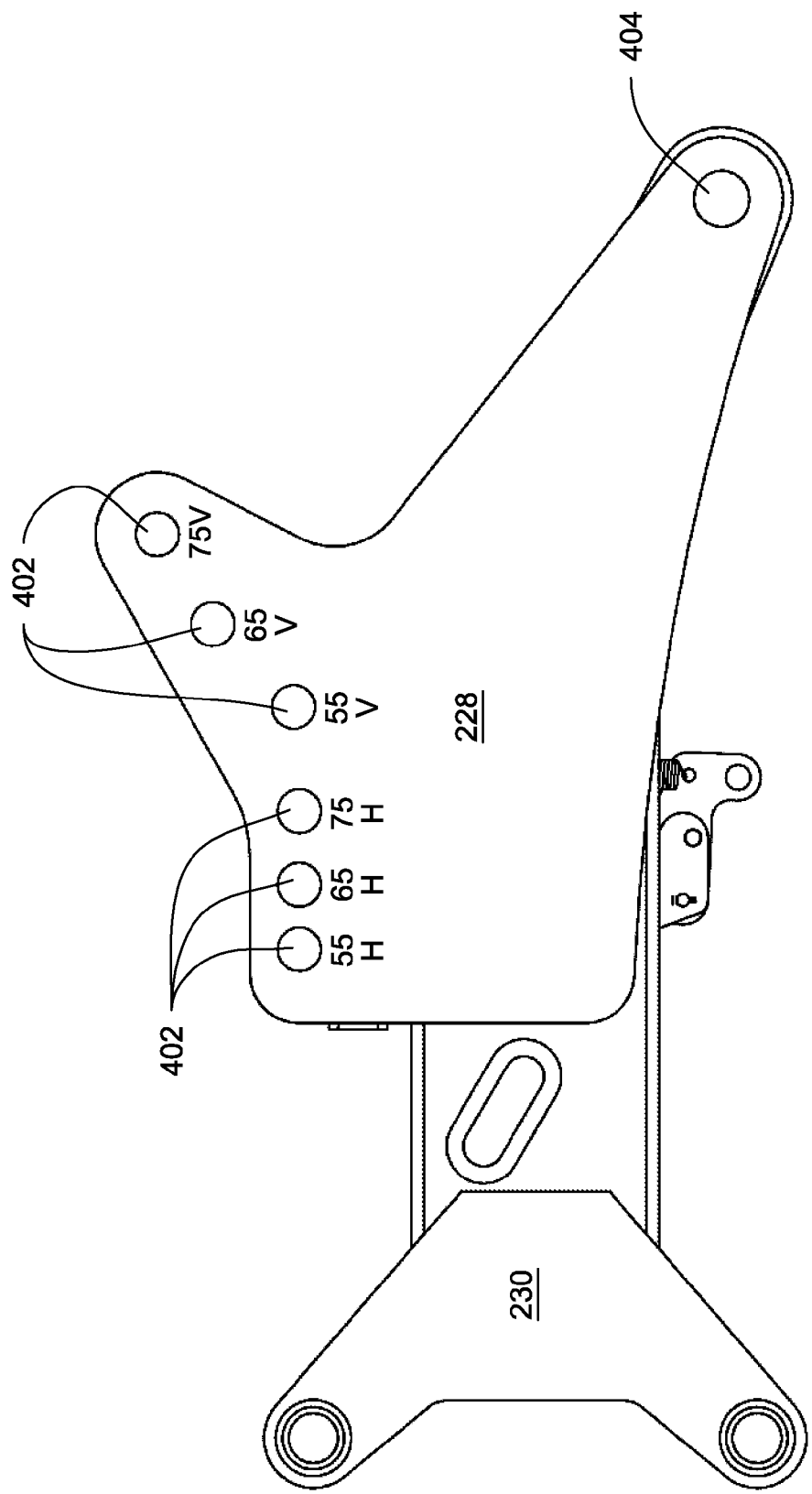

MOBILE CONDUCTOR LIFT

PRIORITY CLAIMS

This application claims priority to U.S. Provisional Application No. 61/857,771, filed Jul. 24, 2013, and No. 61/883,993, filed Sep. 28, 2013, which are hereby incorporated by reference.

TECHNICAL FIELD OF THE INVENTION

The present invention is generally directed devices which attach to mobile cranes, lift trucks, and the like, to facilitate temporary support of electrical power transmission lines.

BACKGROUND ART OF THE INVENTION

Transmission and distribution of electrical power typically relies on sets of high-voltage conductors. In one common arrangement, a set of three conductors, each transmitting one phase of a three-phase alternating-current system, are strung in parallel, spaced apart from each other. The conductors often extend long distances and are supported by periodically-spaced poles or towers ("supports"). The supports keep the conductors above the ground and ensure that the conductors remain spaced adequately apart from each other.

Each support comprises one or more insulator for each conductor. The insulators, often in the form of an insulator stem, are intended to prevent the transmission of current from one conductor to another conductor or to the ground.

It is often necessary to perform maintenance on or to replace a support, an insulator, or other equipment. However, the hazards inherent in working around high-voltage transmission lines limits the work that can be done on supports and components while energized conductors are in place. Further, since the conductors associated with each support may be providing power to hundreds of thousands of customers, de-energizing the conductors would be a huge disruption to power customers and is therefore impractical. Therefore, it is useful to provide a mobile conductor lift, capable of supporting an energized or nonenergized, multi-phase conductor set, and holding the conductors away from the support being accessed.

Other mobile conductor support devices have been proposed, such as conductor lifts which attach to the boom of a boom truck, crane, or similar equipment ("vehicle"). Those devices, however, prevent the vehicle from being used for other purposes with the conductor lift attached. Additionally, the conductor lifts are not easily removed or re-installed. Further, when detatched, the prior art conductor lifts are generally large, unwieldy, and difficult to store.

What is needed is a conductor lift that can remain attached to a boom while allowing the boom to be used for other purposes. Another need is a conductor lift capable of being folded for convenient storage.

SUMMARY

Problems and limitations in the prior art are overcome by providing a conductor lift attachment for a boom lift with a mounting plate. In one embodiment the conductor lift comprising a lift attachment plate configured to hingedly connect to the mounting plate, wherein the lift attachment plate is configured so that the conductor lift is selectively movable from a use-ready position to a stowed position; a lift adaptor attached to the lifter plate; an arm hub attached to the lift adaptor; a first arm hingedly connected to the arm hub; a first insulator stem with a first end and a second end, the first end being connected to the first arm; a first conductor holder connected to the second end of the first insulator stem; a second arm hingedly connected to the arm hub; a second insulator stem with a first end and a second end, the first end being connected to the second arm; a second conductor holder connected to the second end of the second insulator stem.

Various embodiments include conductor lifts with additional features including, without limitation:

- a first arm gear rotably connected to the arm hub and connected to the first arm; and a second arm gear rotably connected to the arm hub and connected to the second arm, wherein the first gear arm and the second gear arm are connected so that angular movement of one of first or second arm gear causes angular movement of the other of first or second arm gear in the opposite direction.
- a position of the first insulator stem that is selectively adjustable along at least a portion of the first arm.
- a position of the second insulator stem that is selectively adjustable along at least a portion of the second arm.
- a plurality of positioning holes defined in the first arm and configured so that the position of the first insulator mount along the first arm can be selected by engagement of the first insulator mount with one of the plurality of holes; and a first insulator mount attached to the first end of the first insulator stem, wherein the first insulator mount is configured to selectively engage one or more of the adjustment holes.
- first arm and second arms comprising an insulating material configured to hinder the conduction of electrical current through said arm.
- a first mount extender connecting the first insulator mount to the first insulator stem and configured to position the first conductor holder at a farther distance from the first arm.
- a second mount extender connecting the second insulator mount to the second insulator stem and configured to position the second conductor holder at a farther distance from the second arm.
- an articulation plate with a boom edge generally opposed to a lift edge and a lower edge generally opposed to an upper edge, wherein the articulation plate is rotably connected to the lifter plate at a position near an intersection of the boom edge and the lower edge, and wherein a plurality of articulation selection holes are defined along the upper edge; and a link bar with a boom end and a lift end, connected at the boom end to the lift plate and configured to be connected at the lift end to one of the plurality of articulation holes.
- a lock notch defined in the first arm gear; and a lock notch engaging member configured to engage the lock notch when the first arm gear is in a desired locked position thereby restricting angular movement of the first arm gear.
- stowage brackets configured to be attached to the boom and to secure the conductor lift to the boom when in the stowed position.
- a center insulator stem positioned between first insulator stem and second insulator stem and connected to one of the first arm, the second arm, or the arm hub; and a center conductor holder connected to the center insulator stem.
- a desiccant positioned within the upper arm and configured to absorb moisture from within the upper arm.

a moisture detector configured to indicate when moisture within the upper arm exceeds a determined level.

BRIEF DESCRIPTION OF THE DRAWINGS

The disclosed inventions will be described with reference to the accompanying drawings, which show important sample embodiments, wherein:

FIG. 4 is a side view of a mast and articulation plate assembly for a conductor lift.

DETAILED DESCRIPTION OF THE PREFERRED EMBODIMENTS

Figure 1:
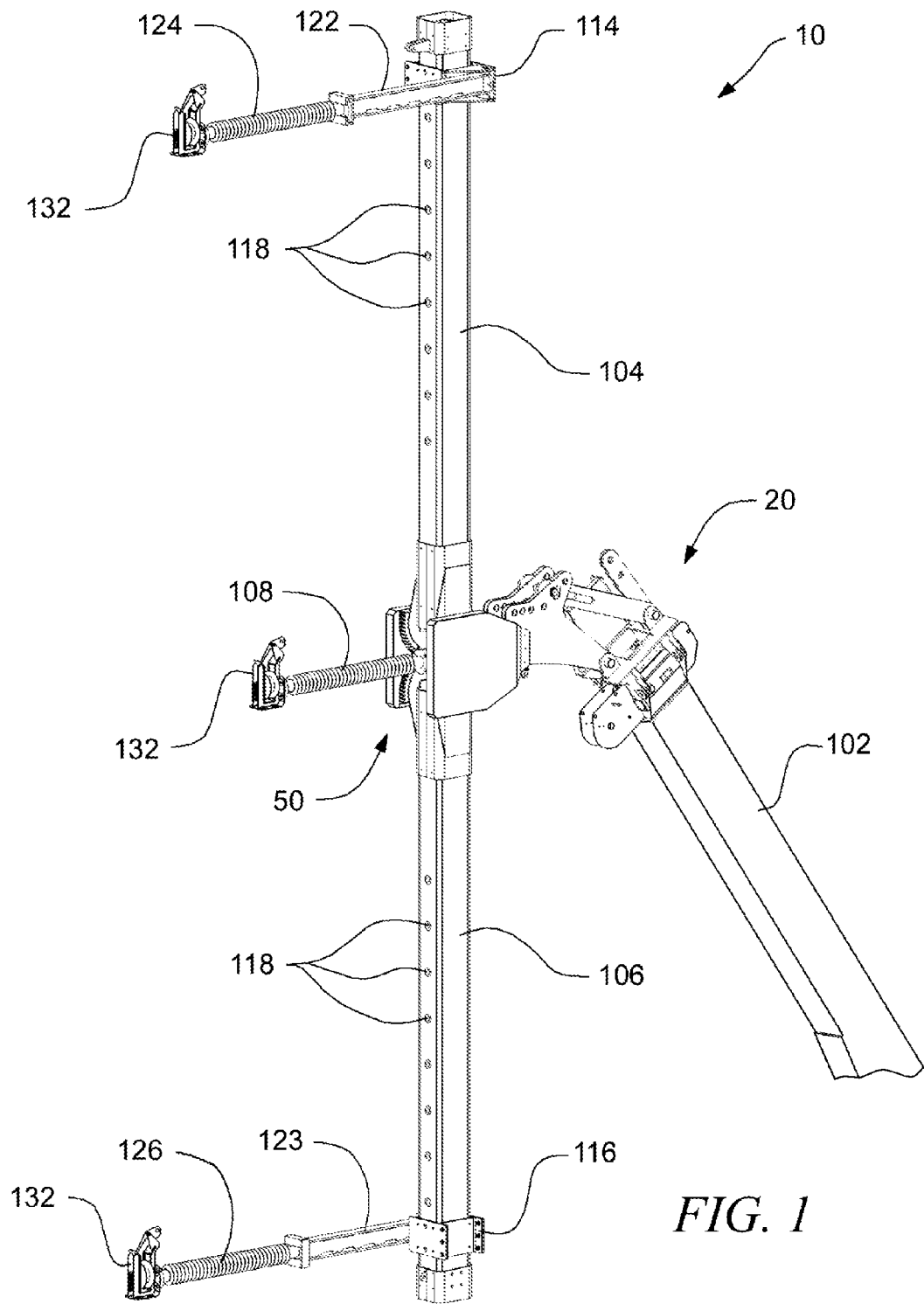
FIG. 1 is a perspective view of a conductor lift.

FIG. 1 illustrates a conductor lift 10 incorporating aspects of the present inventions. The embodiment of conductor lift 10 illustrated in FIG. 1 is generally configured to be used with three-phase 115 kV power distribution systems. The three-phase 115 kV embodiment is used throughout this description to illustrate the inventions. However, persons of ordinary skill in the art will appreciate that conductor lift 10 can be modified and sized for use with other power distribution systems, including, without limitation, systems with higher or lower voltages, two-phase systems, DC systems, systems including static lines, and systems using multiple conductors per phase. Additionally, although many disclosed features are especially well-suited for use with energized conductors, conductor lift 10 can also be used in non-energized situations.

Conductor lift 10 is configured to be mountable on a boom 102 of a lift truck 100 (see FIGS. 12 and 13) or similar device. Conductor lift 10 is preferably connected to boom 102 by mounting assembly 20. Mounting assembly 20—described in greater detail below in connection with FIG. 2—provides several benefits including, without limitation, the ability to adjust the articulation of conductor lift 10 with respect to boom 102 and the ability to stow conductor lift 10 on a side of boom 102 when conductor lift 10 is not in use.

Mounting assembly 20 is connected to arm hub 50 of conductor lift 10. Arm hub 50 is described in greater detail in connection with FIGS. 5A and 5B, below.

Extending from arm hub 50 are upper arm 104, lower arm 106, and center insulating stem 108. Upper arm 104 and lower arm 106 are preferably constructed from a strong material with a high electrical resistance, such as fiberglass. In the event that a conductor becomes loose and contacts upper arm 104 or lower arm 106, the high electrical resistance material provides a length of insulation, which helps to prevent electricity from arcing back to boom 102. However, upper arm 104 and lower arm 106 do not have to be insulating and can alternatively comprise other materials, including conductive materials such as steel, aluminum, or other metals, with or without external insulation.

When configured for use in a three-phase 115 kV system, upper arm 104 and lower arm 106 are preferably between 10 and 16 feet long; more preferably between 14 and 15 feet long; and most preferably about 14.5 feet long. For use with other systems, upper arm 104 and lower arm 106 can be made shorter or longer, as appropriate. Alternatively, arm hub 50 can be positioned at a point other than the midpoint of conductor lift 10, and upper arm 104 made a different length than lower arm 106. In such embodiment, center insulating stem 108, if used, is preferably positioned at or near the midpoint, rather than attached to arm hub 50.

An upper bracket 114 is attached to upper arm 104. Upper bracket 114 is configured to be selectively positionable along upper arm 104. Similarly, a lower bracket 116 is attached to and selectively positionable along lower arm 106. In the illustrated embodiment, selective positioning is accomplished using holes 118 defined in upper arm 104 and lower arm 106 at increments between about 3 and 12 inches, and most preferably at about six inches. However, other methods for selective positioning are known and can be used. Alternatively, for applications in which adjustive positioning is unnecessary, upper bracket 114 and lower bracket 116 can be attached at fixed positions.

In the illustrated embodiment, extenders 122, 123 are shown attached to upper bracket 114 and lower bracket 116, respectively. At a distal end of extender 122 from upper bracket 114 is upper insulating stem 124. At a distal end of extender 123 from lower bracket 116 is lower insulating stem 126. Wire holders 132 (or any other conductor-holding device) are secured at a distal end of each of upper insulating stem 124, center insulating stem 108, and lower insulating stem 126. Alternatively, depending on the conductor configuration, extenders 122, 123 can be removed so that upper insulating stem 124 connects directly to upper bracket 114 and lower insulating stem 126 connects directly to lower bracket 116. Upper bracket 114 and lower bracket 116 preferably comprise quick disconnect sockets (see FIGS. 8A and 8B) configured to hold extenders 122 and 123 or insulating stems. Similarly, extenders 122 and 123 preferably comprise compatible quick disconnect sockets configured to hold insulating stems. In an alternative embodiment, if a conductor lift will not be used for work on energized conductors, insulating stems are not necessary and can be omitted or replaced by non-insulating components.

Figure 2:
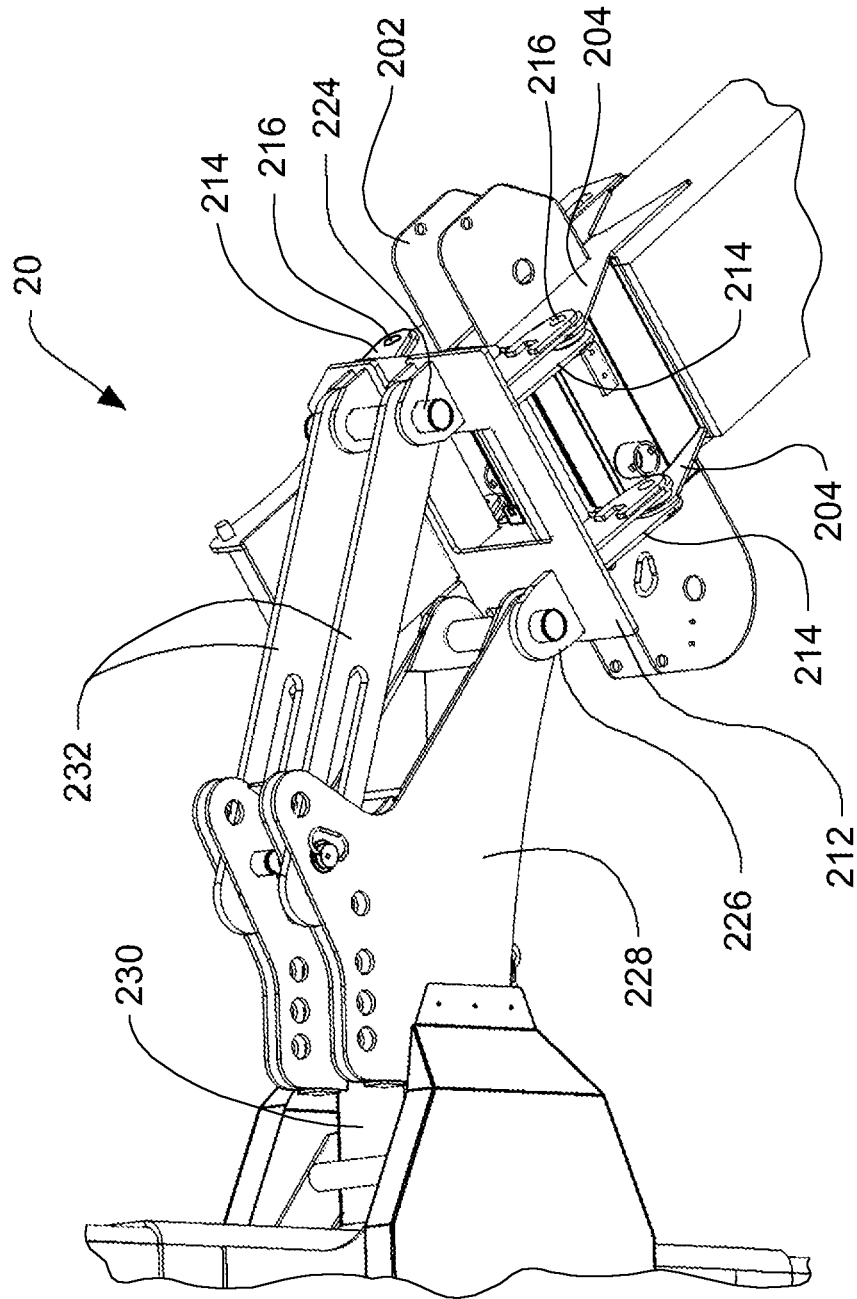
FIG. 2 is a closer view of a mounting assembly for a conductor lift.

FIG. 2 is a closer view of mounting assembly 20. Mounting assembly 20 comprises adapter plate 212, articulation plates 228, and link bars 232 or 234 (see FIG. 3B). Adapter plate 212 comprises attachment tabs 214, which correspond to boom tip tabs 204 on boom tip 202. Adapter plate 212 is secured to boom tip 202 by attachment pins 216 placed through holes defined in attachment tabs 214 and boom tip tabs 204. Removing two attachment pins 216 from one side of mounting assembly 20 allows adapter plate 212 and conductor lift 10 to rotate between a use position and a stowed position.

Figure 9A:
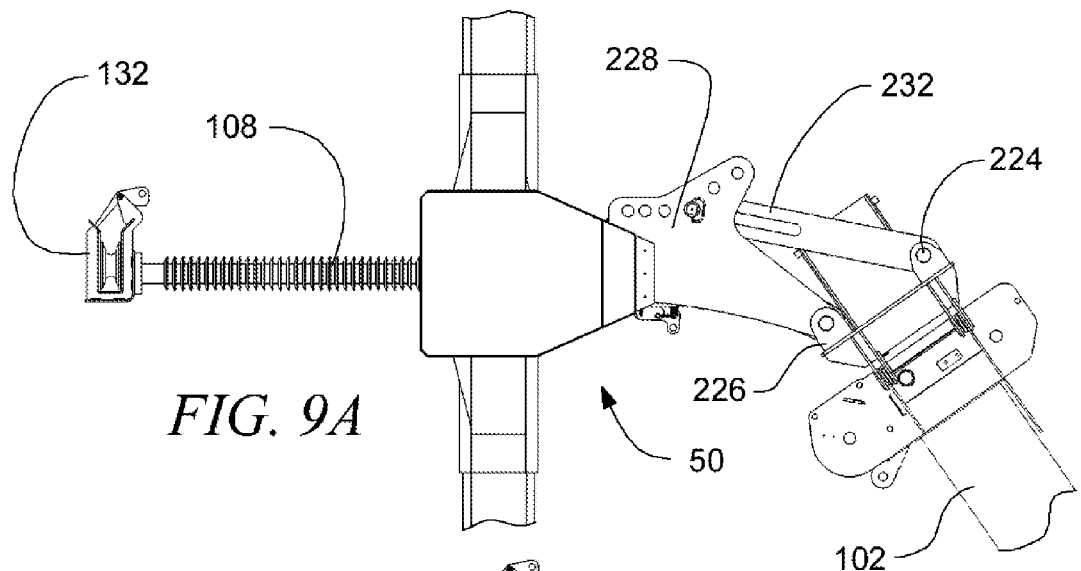
FIG. 9A is a side view of a mounting assembly and arm hub in a vertical position.
Figure 9B:
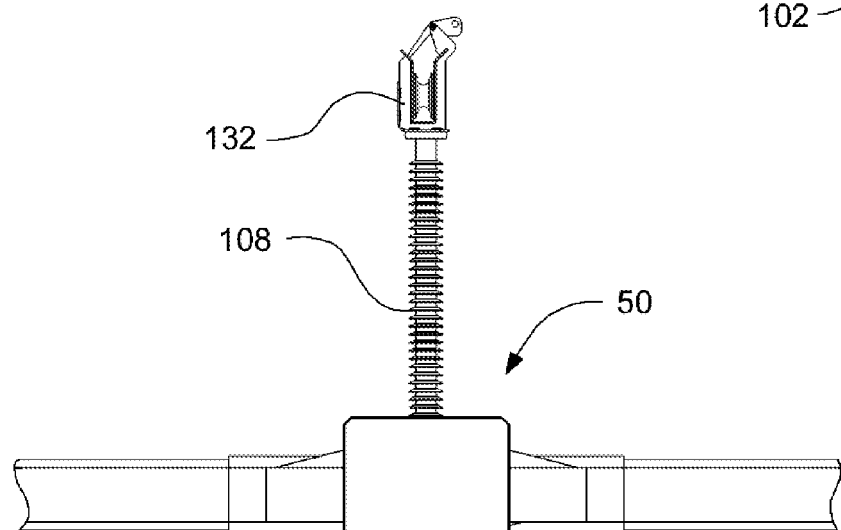
FIG. 9B is a side view of a mounting assembly and arm hub in a horizonal position.

Adapter plate 212 preferably comprise an upper pivot point 224 and a lower pivot point 226. Lower pivot point 226 is rotatably attached to pivot holes 404 (see FIG. 4) defined in articulation plates 228. A vertical link bar 232 or a horizontal link bar 234 are rotatably attached at one end to upper pivot point 224 and at the other end to articulation plate 228. As shown in FIG. 9A, for vertical configuration of conductor lift 10, vertical link bar 232 is preferably a slotted bar. As shown in FIG. 9B, for horizontal configuration of conductor lift 10, horizontal link bar 234 is preferably a shorter bar with holes defined near each end.

Figure 3A:
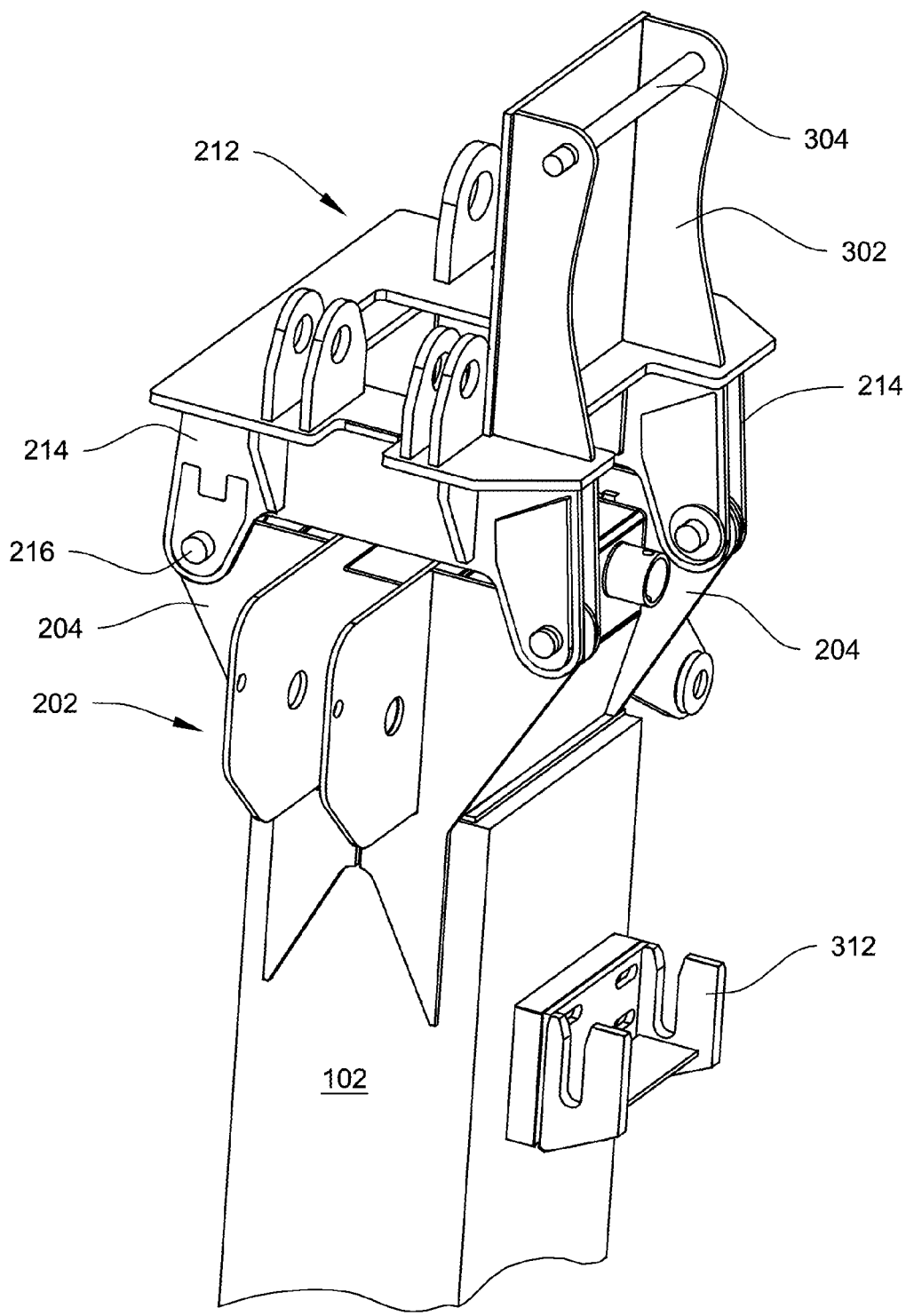
FIG. 3A is a perspective view of a boom tip and mounting plate in a deployed position.

FIG. 3A is a closer view of boom tip 202 and adaptor plate 212. Boom tip tabs 204 extend from each side of boom tip 202. Boom tip 202 and boom tip tabs 204 are preferably existing features on boom 102. Attachment tabs 214 extend from adaptor plate 212 and align with boom tip tabs 204. Adaptor plate 212 is secured to boom tip 202 by placing attachment pins 216 through holes defined in boom tip tabs 204 and attachment tabs 214.

Figure 3B:
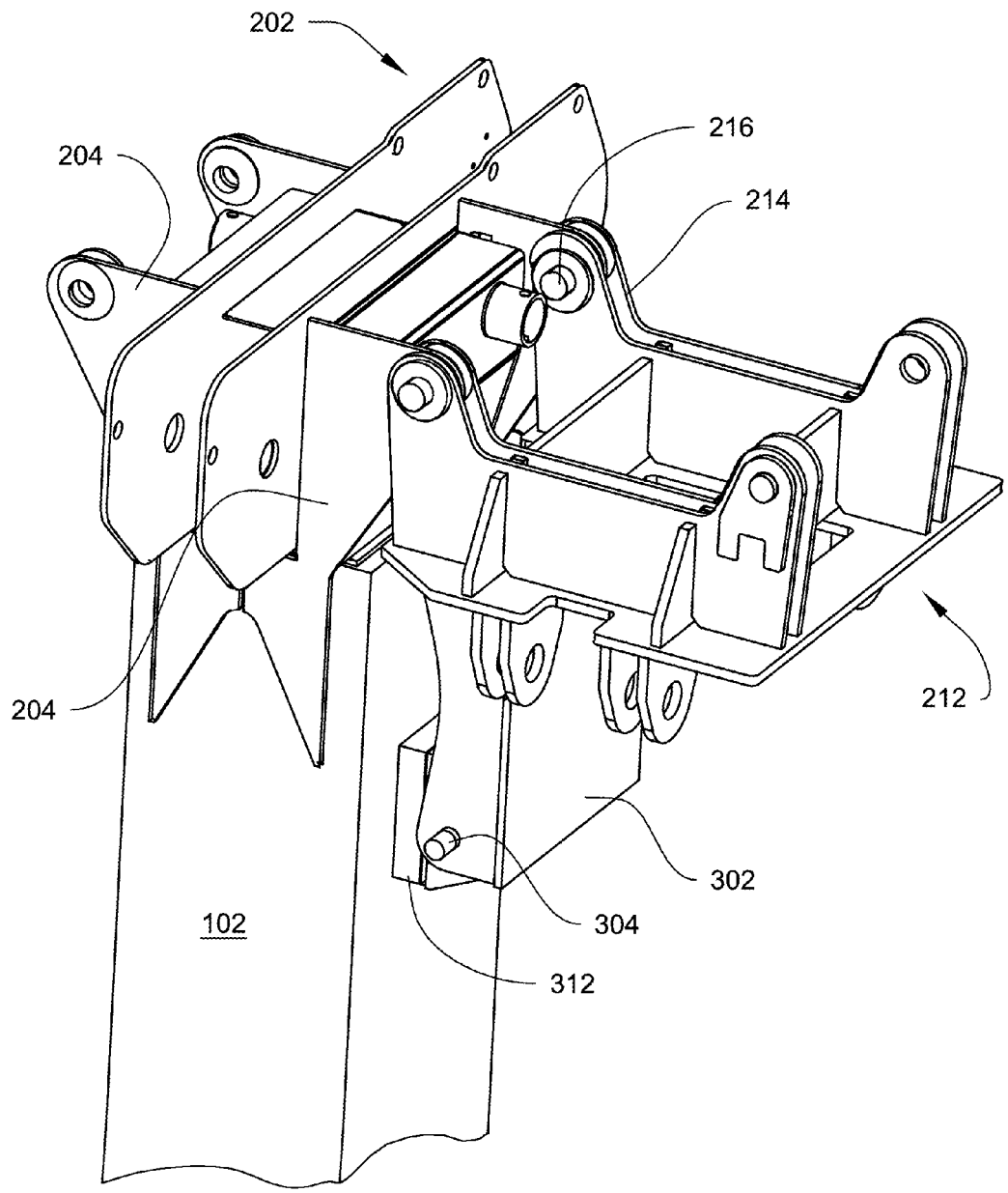
FIG. 3B is a perspective view of a boom tip and mounting plate in a stowed position.

FIG. 3B illustrates boom tip 202 and adaptor plate 212 in an alternative configuration. In this view, two attachment pins 216 have been removed, allowing adaptor plate 212 to hingedly rotate and place conductor lift 10 alongside boom 212. In this configuration, a stow latch 302 comprising a stow bar 304 engages boom slots 312.

FIG. 4 shows a closer view of mast 230 and articulation plate 228 with one possible configuration of link attachment points 402 and pivot holes 404. Link attachment points 402 represent holes defined in articulation plates 228. By connecting vertical link bar 232 or horizontal link bar 234 to a particular link attachment point 402, the orientation of conductor lift 10 with respect to boom 102 can be selected. Preferably, vertical link bar 232 is attached to a link attachment point 402 with a "V" (vertical) symbol, while horizontal link bar 234 is attached to a link attachment point 402 with an "H" (horizontal) symbol. At least one link attachment point 402 preferably corresponds to a stowed position using vertical link bar 232, horizontal link bar 234, or a special stow link bar (not shown).

Components of mounting assembly 20 are preferably made of metal such as steel for durability and strength. Alternatively, certain components, such as articulation plates 228 and adapter plate 212 can comprise non-conducting material to reduce the risk of undesired transmission of electric current.

Figure 5A:
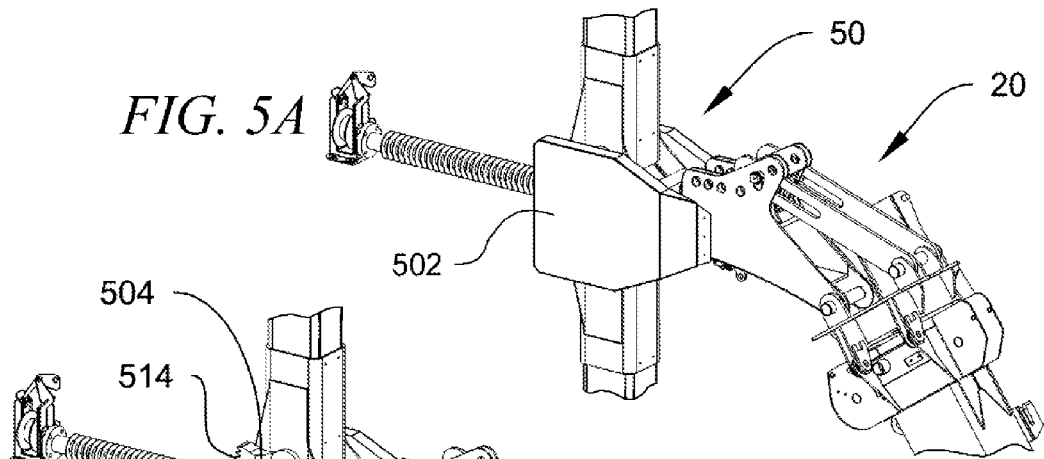
FIG. 5A is a closer view of a mounting assembly and an arm hub for a conductor lift.

FIG. 5A provides another view of mounting assembly 20. Mounting assembly 20 also comprises arm hub 50. Arm hub 50 comprises hub covers 502, which provide a physical barrier to protect users from the moving parts within.

Figure 5B:
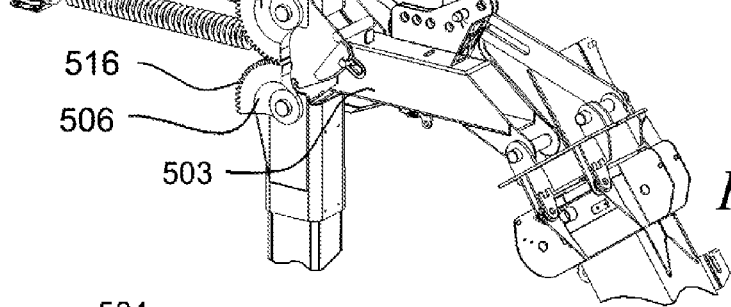
FIG. 5B is the view of FIG. 5A with certain components removed for clarify.

FIG. 5B shows arm hub 50 with one hub cover 502 and one articulation plate 228 removed for clarity. Between articulations plates 228 is mast 230. Mast 230 is preferably welded to articulation plates 228, so that two or more articulation plates 228 and mast 230 function as a single part in the assembled device. At arm hub 50, upper arm 104 is attached to upper arm crank 504 and lower arm 106 is attached to lower arm crank 506. Upper arm crank 504 and lower arm crank 506 are each hingedly connected to mast 503.

Upper arm crank 504 comprises upper gear teeth 514. Lower arm crank 506 comprises lower gear teeth 516. Upper gear teeth 514 and lower gear teeth 516 are interconnected so that angular movement of lower arm 106 with respect to arm hub 50 will cause an analogous angular movement of upper arm 104 in the opposite direction. The mechanical linking of upper arm 104 and lower arm 106 facilitates deploying and stowing of conductor lift 10, allowing convenient manual manipulation without powered assistance.

Preferably, upper arm crank 504 and lower arm crank 506 are configured so that, at one extreme end of a prescribed range of motion, upper arm 104 and lower arm 106 will appear to form a single straight shaft. At an opposite extreme end of the prescribed range of motion, upper arm 104 and lower arm 106 are preferably substantially parallel and adjacent (See FIG. 11).

Figure 10:
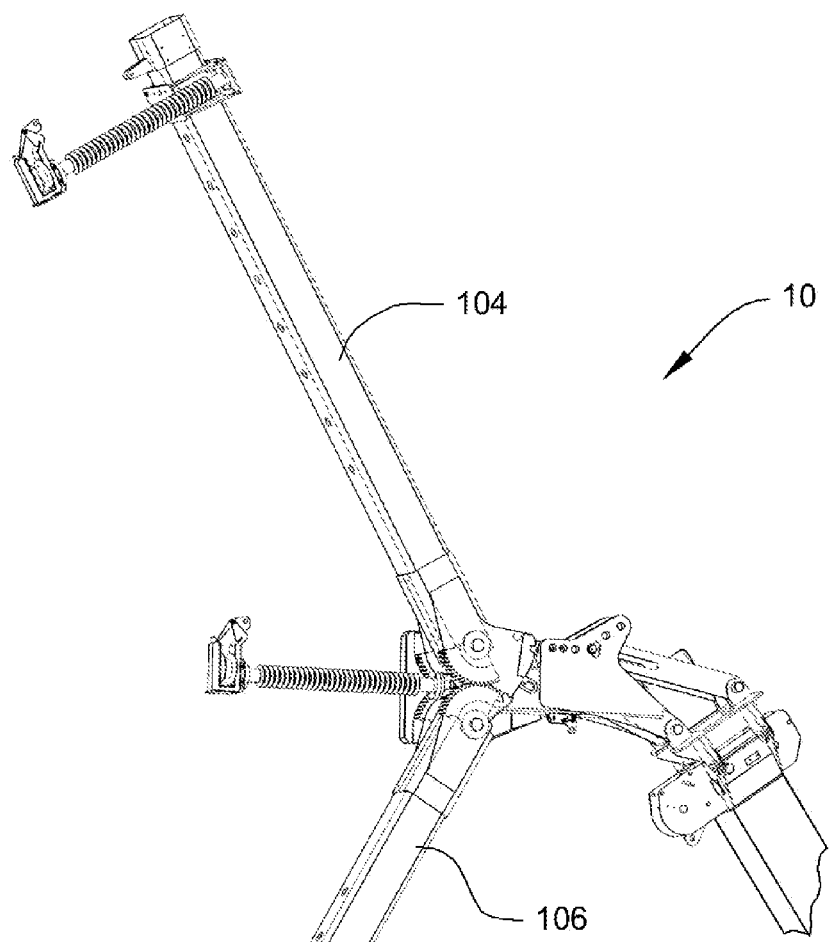
FIG. 10 is a perspective view of a conductor lift with arms in an intermediate position and with one hub cover removed.

Additionally, as illustrated in FIG. 10, upper arm 104 and lower arm 106 can be positioned at an intermediate alignment. In this configuration, wire holders 132 attached to upper arm 104 and lower arm 106 can engage offset conductors without the use of extenders 122, 123.

Figure 6:
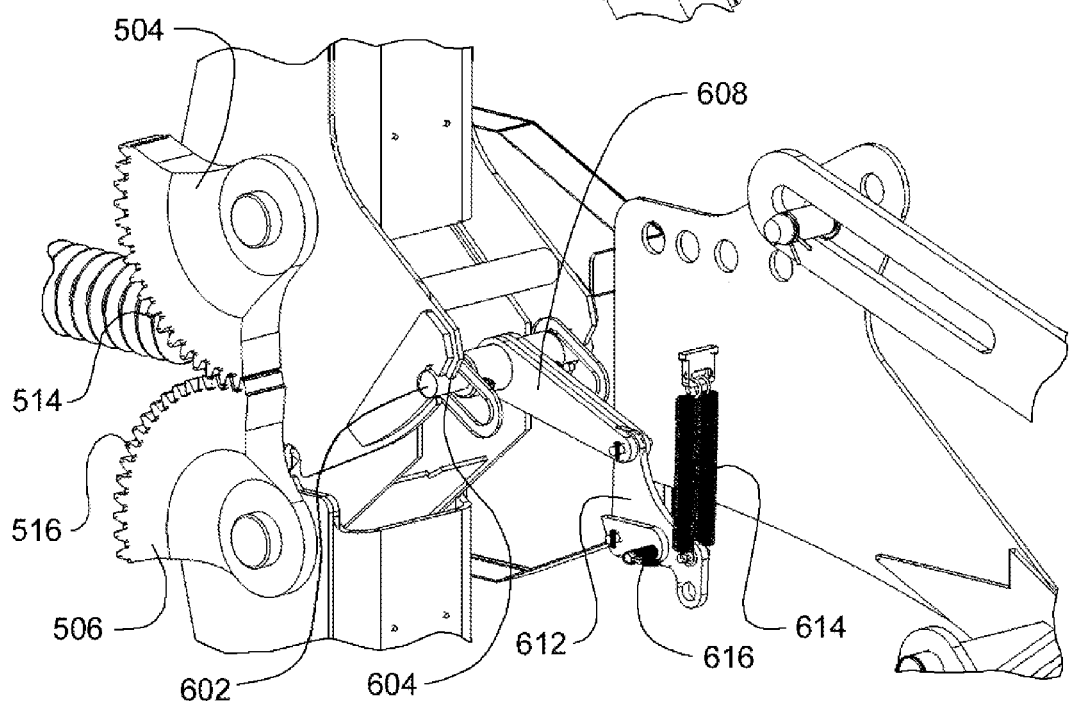
FIG. 6 illustrates a locking mechanism for an arm hub.

FIG. 6 shows arm hub 50 with one articulation plate 228 and mast 230 removed to show a a locking mechanism that can be used with arm hub 50. When upper arm 104 is in a desired position (e.g. fully opened or in an intermediate alignment), a sliding pin 602 engages a notch 604 defined in upper arm crank 504. Sliding pin 602 is held in place by cam 608, rocker arm 612, and spring 614. Sliding pin 602 prevents rotation of upper arm 104 and lower arm 106, until sliding pin 602 is released by pulling on rocker arm 612. A locking pin 616 prevents movement of rocker arm 612 and prevents accidental disengagement of sliding pin 602, e.g. due to spring 614 failure. Alternatively, other locking mechanisms are known and could be used.

Figure 7:
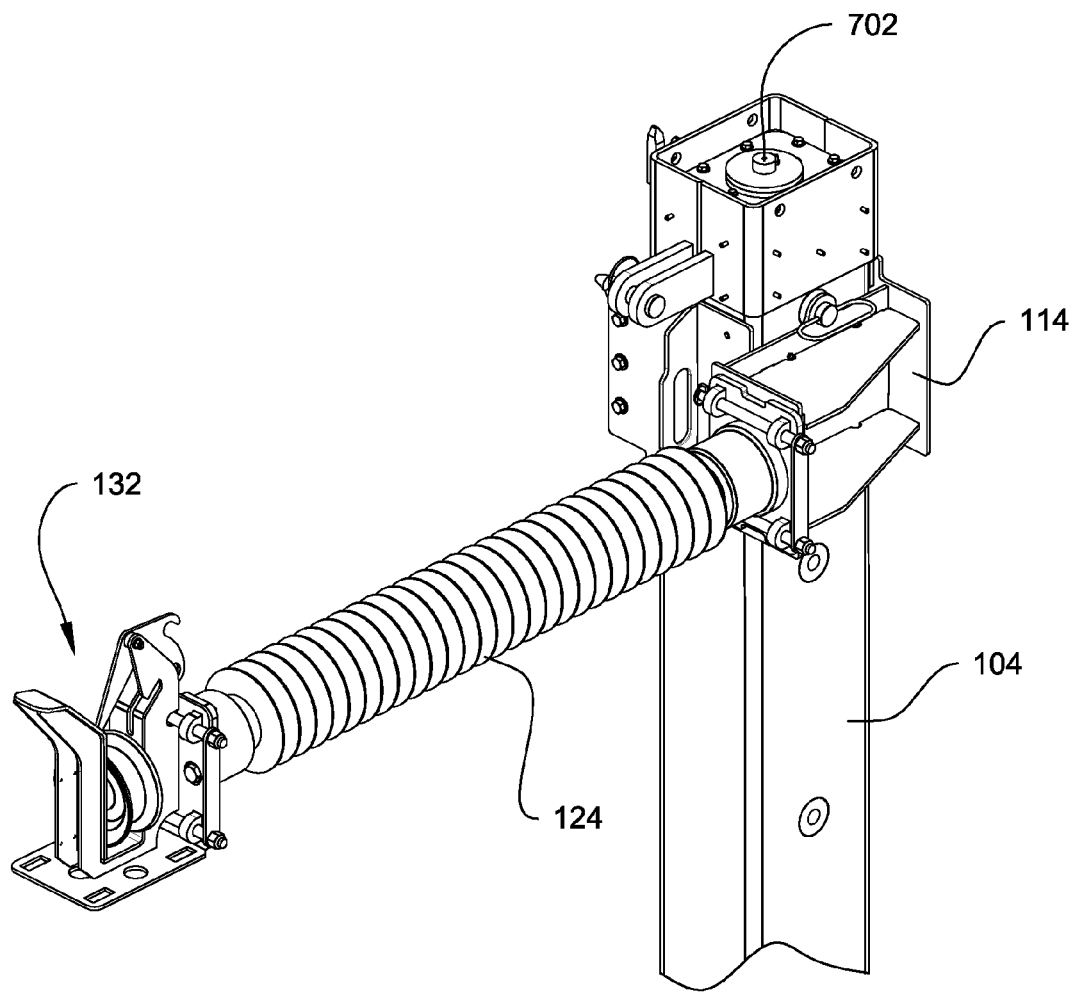
FIG. 7 is a perspective view of an arm for a conductor lift with a bracket, insulating stem and conductor holder.

FIG. 7 is a closer view of upper arm 104, upper bracket 114, upper insulating stem 124, and wire holder 132. Near the upper end of upper arm 104 is a dessicant canister 702. Dessicant canister 702 plugs the upper arm 104 and contains a dessicant material which absorbs moisture from the interior of upper arm 104. Dessicant canister 702 also preferably functions as a moisture indicator by comprising at least one moisture-sensitive element that changes color when moisture is present within upper arm 104. Preferably, a similar dessicant and moisture indicator system is provided for lower arm 106.

Figure 8A:
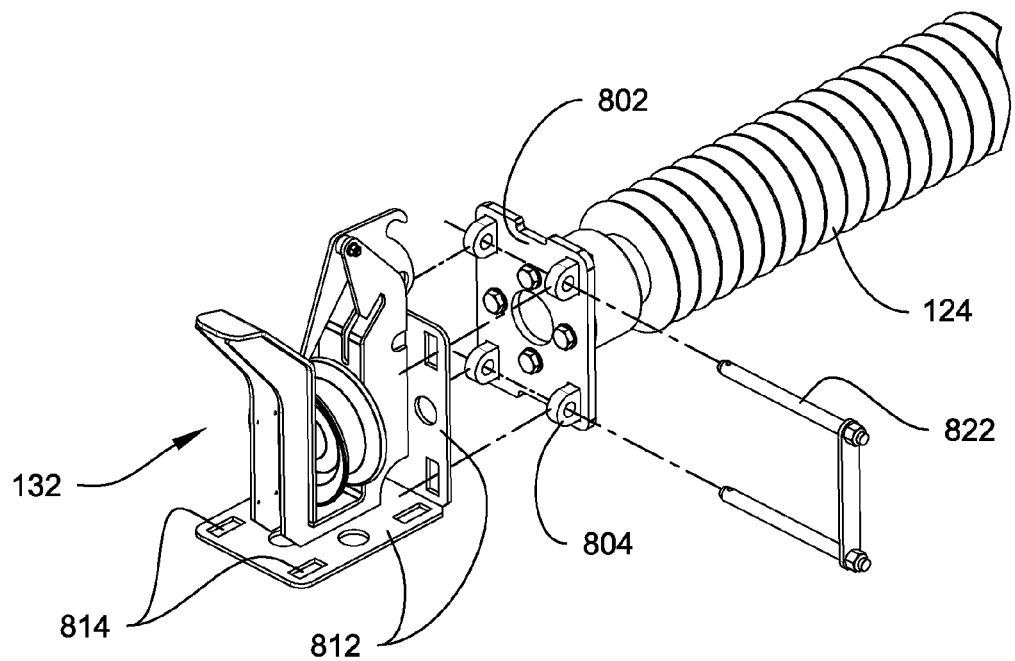
FIGS. 8A and 8B illustrate an embodiment of a quick connection system for components of a conductor lift.
Figure 8B:
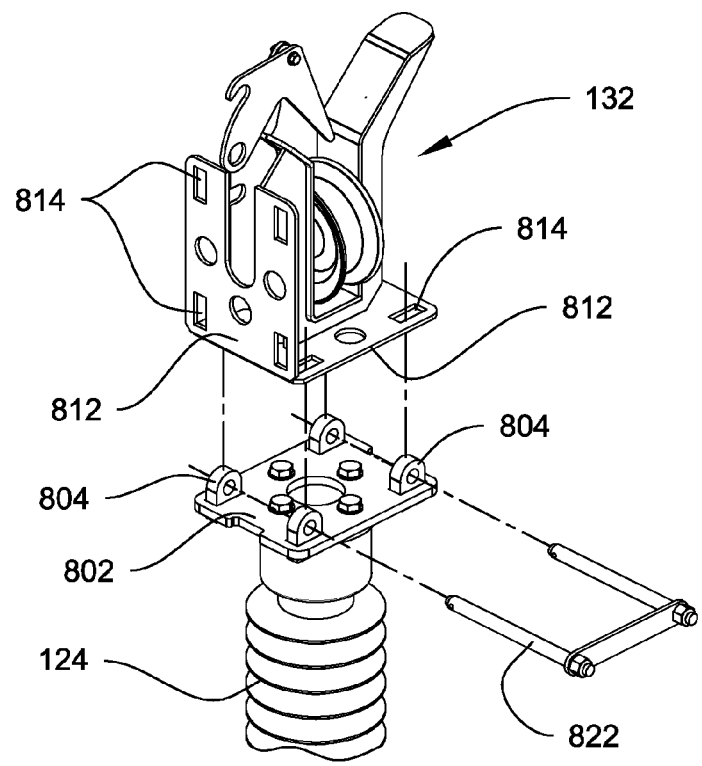

FIGS. 8A and 8B illustrate one embodiment of a quick connect system. A connection plate 802 is attached to insulating stem 122. Connection plate 802 comprises connection loops 804. Receiver plates 812 are attached to wire holder 132. Receiver plates 812 comprise receiver slots 814, which are configured to align with connection loops 804 so that connection loops 804 extend through receiver slots 812 when a receiver plate 812 is adjacent connection plate 802. Wire holder 132 can be quickly secured to insulating stem 124 by inserting a u-bar 822 through connection loops 804 and securing the u-bar 822 in place with fasteners such as threaded nuts. Wire holder 132 preferably comprises two orthogonally-oriented receiver plates 812 to allow installation of wire holder 132 either vertically or horizontally with respect to insulating stem 124. Preferably, compatible quick connect systems are used to connect all extenders, insulating stems, and wire holders.

FIGS. 9A and 9B illustrate conductor lift 10 in vertical and horizontal alignments, respectively, with respect to boom 102. FIG. 9A includes vertical link bar 232, while FIG. 9B includes horizontal link bar 234.

FIG. 10 illustrates upper arm 104 and lower arm 106 positioned in an intermediate (offset) alignment.

Figure 11:
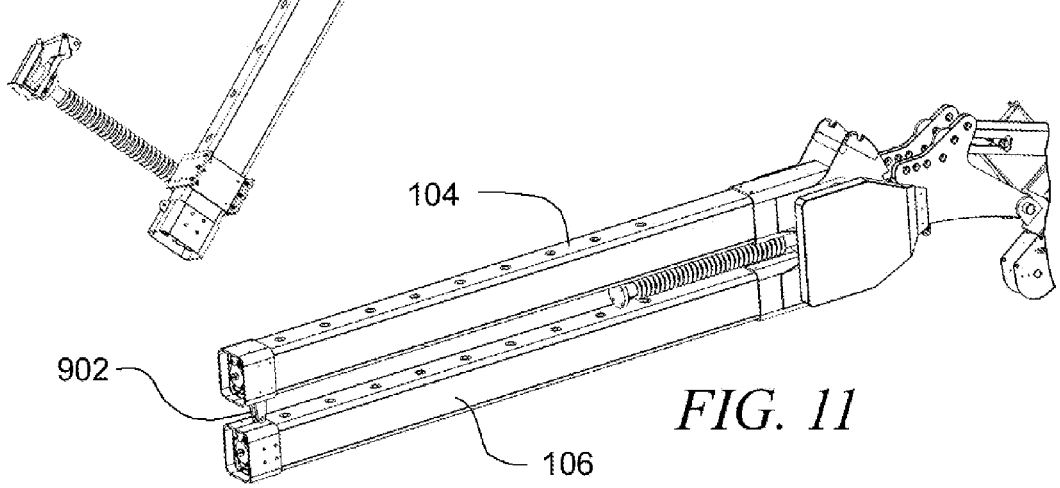
FIG. 11 is a perspective view of a conductor lift with arms in a closed position.

FIG. 11 illustrates conductor lift 10 in a folded position. In the folded position, upper arm 104 and lower arm 106 are generally parallel to each other. A link mechanism 902 can be used to maintain this relationship.

Figure 12:
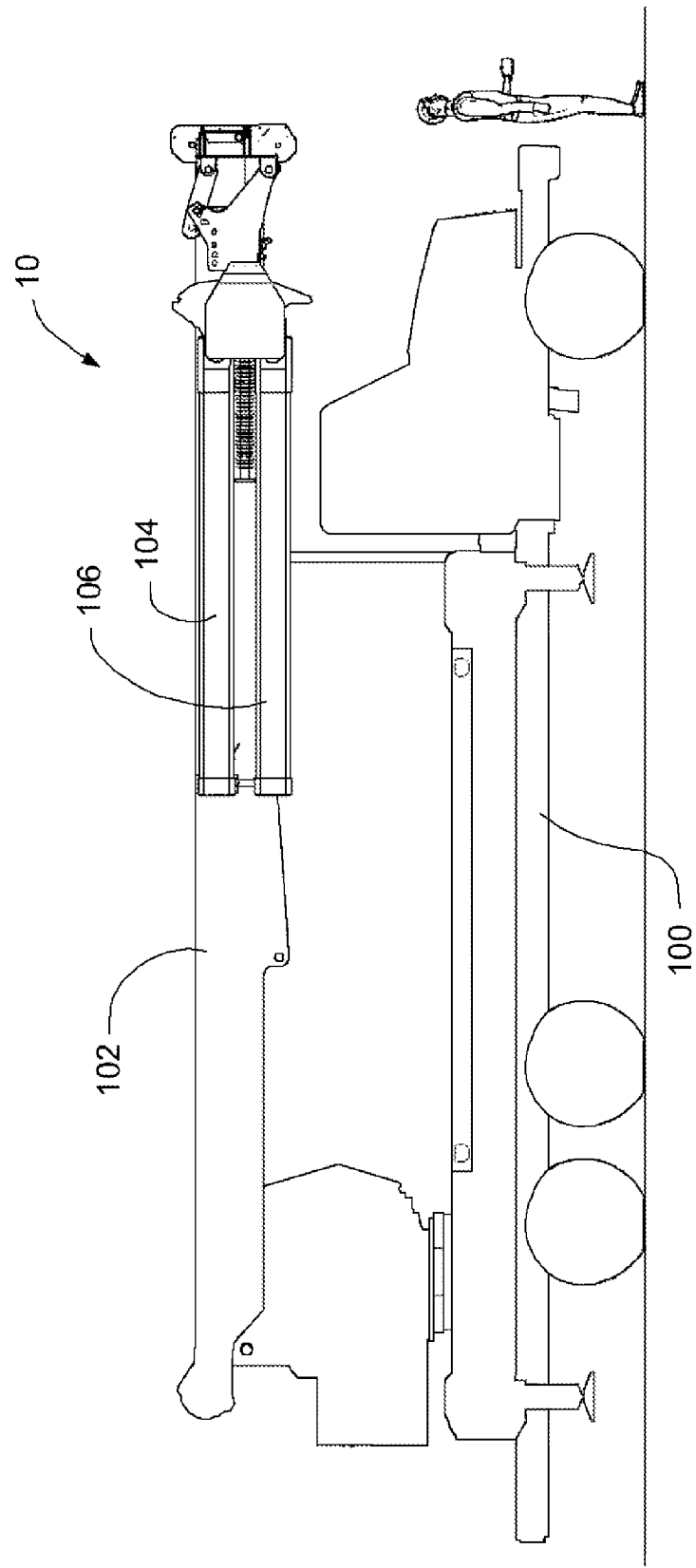
FIG. 12 illustrates a conductor lift in a stowed position attached to a truck.

FIG. 12 shows conductor lift 10 in a stowed position. Upper arm 104 and lower arm 106 are also parallel to boom 102. Attachment sockets (not shown) preferably secure upper arm 104, lower arm 106, or both, to boom 102 when conductor lift 10 is stowed. In FIG. 12, adaptor plate 212 is shown as still connected on one side to boom tip 202. Alternatively, adaptor plate 212 can be fully disconnected from boom tip 202 and be supported by boom slots 312 and attachment sockets. Further alternatively, after adaptor plate 212 is fully disconnected from boom tip 202, conductor lift 10 can be removed from lift truck 100 for storage or for use at another location.

Figure 13:
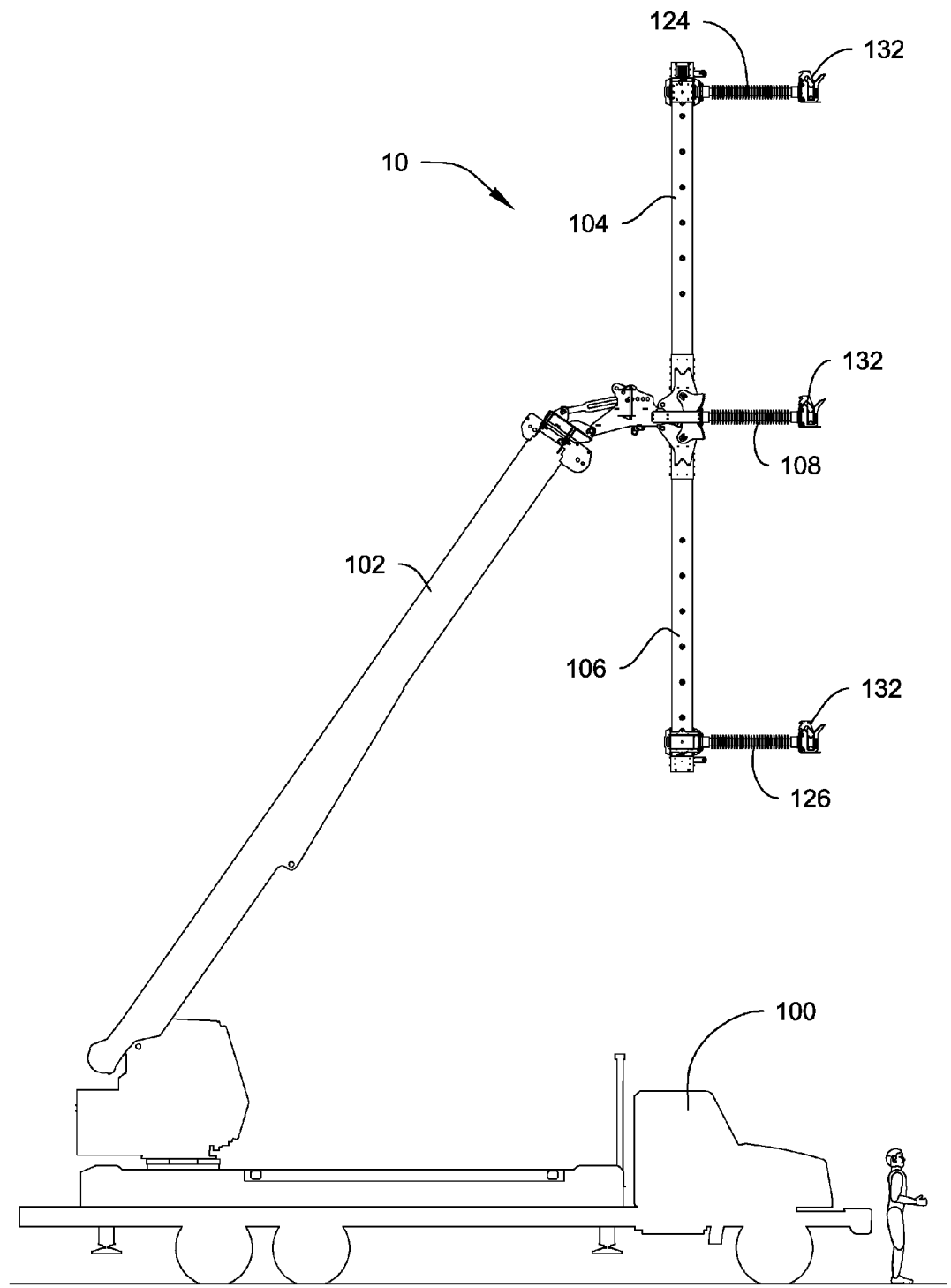
FIG. 13 illustrates a conductor lift in a vertically-deployed position attached to a truck.

FIG. 13 shows conductor lift 10 in a deployed position ready for use.

Figure 14:
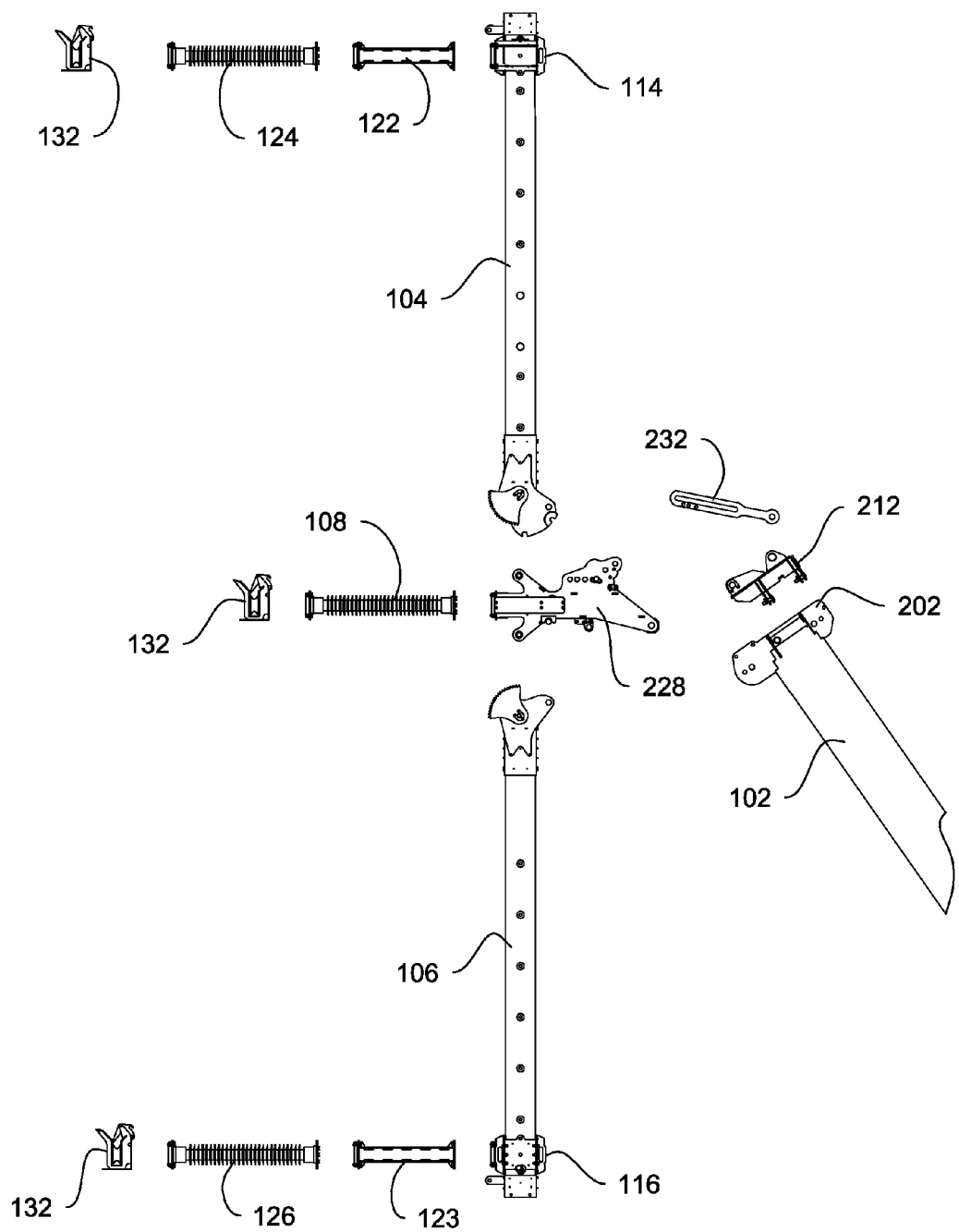
FIG. 14 is an exploded view of a conductor lift.

FIG. 14 is an exploded view of a conductor lift illustrating various components.

Although the invention has been described with reference to specific embodiments, this description is not meant to be construed in a limiting sense. Various modifications of the disclosed embodiments, as well as alternative embodiments of the inventions, will be apparent to persons skilled in the art upon reference to the description of the invention. It is, therefore, contemplated that the appended claims will cover such modifications that fall within the scope of the invention.

We claim:

1. A conductor lift attachment for a boom lift with a mounting plate and a mounting hole defined therein comprising:
   a lift attachment plate comprising an attachment tab and an attachment hole defined in the attachment tab, wherein the attachment hole is configured to align with the mounting hole of the mounting plate;
   a mounting pin configured to engage the attachment hole and the mounting hole, to hingedly connect the lift attachment plate and the mounting plate, allowing the conductor lift to be selectively movable between a use-ready position and a stowed position;
   a lift adaptor attached to the lift attachment plate;
   an arm hub attached to the lift adaptor;
   a first arm gear rotably connected to the arm hub;
   a first arm connected to the first arm gear;
   a first insulator stem with a first end and a second end, the first end being connected to the first arm;
   a first conductor holder connected to the second end of the first insulator stem;
   a second arm gear rotably connected to the arm hub;
   a second arm connected to the second arm gear, wherein the first arm gear and the second arm gear are connected so that angular movement of one of first or second arm gear causes angular movement of the other of first or second arm gear in the opposite direction;
   a second insulator stem with a first end and a second end, the first end being connected to the second arm;
   a second conductor holder connected to the second end of the second insulator stem.

2. The conductor lift of claim 1 wherein the position of the first insulator stem is selectively adjustable along at least a portion of the first arm.

3. The conductor lift of claim 2 wherein the position of the second insulator stem is selectively adjustable along at least a portion of the second arm.

4. The conductor lift of claim 1 further comprising:
   a plurality of positioning holes defined in the first arm; and
   a first insulator mount attached to the first end of the first insulator stem, wherein the first insulator mount is configured to selectively engage one or more of the positioning holes.

5. The conductor lift of claim 4 further comprising a first mount extender connecting the first insulator mount to the first insulator stem and configured to position the first conductor holder at a farther distance from the first arm versus the distance of the first conductor holder from the first arm without the first mount extender.

6. The conductor lift of claim 5 further comprising:
   a plurality of positioning holes defined in the second arm;
   a second insulator mount attached to the first end of the second insulator stem, wherein the second insulator mount is configured to selectively engage one or more of the positioning holes; and
   a second mount extender connecting the second insulator mount to the second insulator stem and configured to position the second conductor holder at a farther distance from the second arm versus the distance of the second conductor holder from the second arm without the second mount extender.

7. The conductor lift of claim 1 wherein the first arm and the second arm comprise an insulating material configured to hinder the conduction of electrical current through said arm.

8. The conductor lift of claim 1 wherein the lift adapter comprises:
   an articulation plate with a boom edge generally opposed to a lift edge and a lower edge generally opposed to an upper edge, wherein the articulation plate is rotably connected to the lift attachment plate at a position near an intersection of the boom edge and the lower edge, and wherein a plurality of articulation selection holes are defined along the upper edge; and
   a link bar with a boom end and a lift end, connected at the boom end to the lift attachment plate and configured to be connected at the lift end to one of the plurality of articulation holes.

9. The conductor lift of claim 1 further comprising:
   a lock notch defined in the first arm gear; and
   a lock notch engaging member configured to engage the lock notch when the first arm gear is in a desired locked position thereby restricting angular movement of the first arm gear.

10. The conductor lift of claim 1 wherein the lift adapter further comprises stowage brackets configured to be attached to the boom and to secure the conductor lift to the boom when in the stowed position.

11. The conductor lift of claim 1 further comprising:
   a center insulator stein positioned between first insulator stem and second insulator stem and connected to one of the first arm, the second arm, or the arm hub; and
   a center conductor holder connected to the center insulator stem.

12. The conductor lift of claim 1 further comprising:
   a desiccant positioned within the first arm and configured to absorb moisture from within the first arm.

13. The conductor lift of claim 12 further comprising:
   a moisture detector configured to indicate when moisture within the first arm exceeds a predetermined level.

14. The conductor lift of claim 1 wherein, in the stowed position, the conductor lift remains attached to the boom and the first arm and the second arm are substantially parallel and adjacent to each other and to the boom.

15. A conductor lift attachment for a boom lift comprising:

a boom mount configured to be attached to a boom;
a lift adaptor connected to the boom mount;
an arm hub connected to the lift adaptor, the arm hub comprising a first arm gear and a second arm gear, wherein the first arm gear and the second arm gear are rotably connected to the arm hub and are cooperatively configured so that rotation of the first arm gear will cause rotation of the second arm gear in the opposite direction;
a first arm connected to the first arm gear;
a first insulator stein with a first end and a second end, the first end being connected to the first arm;
a first conductor holder connected to the second end of the first insulator stem;
a second arm connected to the second arm gear;
a second insulator stem with a first end and a second end, the first end being connected to the second arm; and
a second conductor holder connected to the second end of the second insulator stem.

16. The conductor lift attachment of claim 15 wherein the boom mount is configured to be hingedly connected to the boom and selectively movable between a deployed position and a stowed position.

17. The conductor lift of claim 15 further comprising:
a lock notch defined in the first arm gear; and
a lock notch engaging member configured to engage the lock notch when the first arm gear is in a desired locked position thereby restricting angular movement of the first arm gear.

\* \* \* \* \*